Sept. 10, 1929.  H. L. MERRICK  1,727,353
PROPORTIONAL MATERIAL FEEDING MEANS
Original Filed Aug. 13, 1924   9 Sheets-Sheet 1
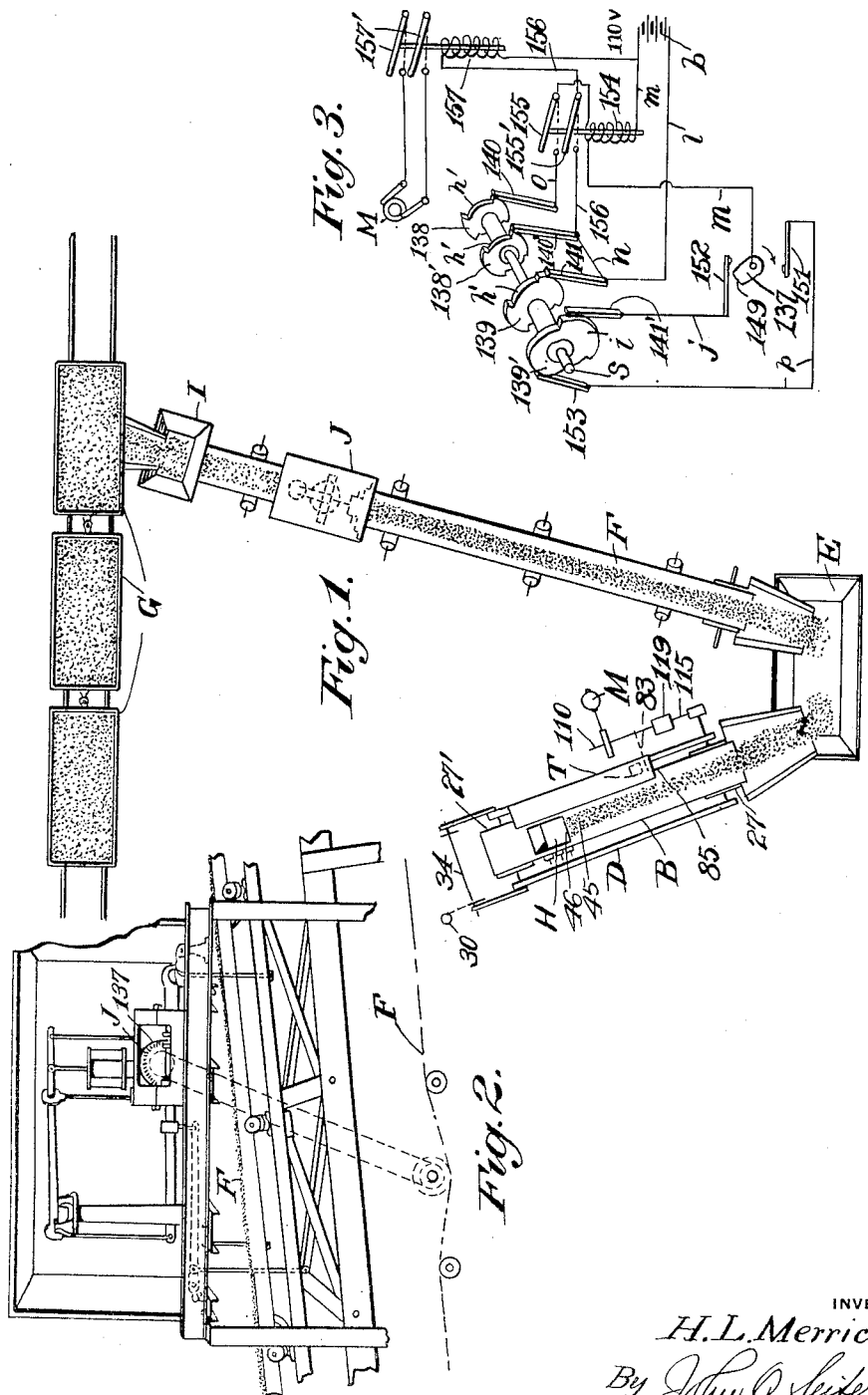
INVENTOR
H. L. Merrick
By John O. Seifert
ATTORNEY

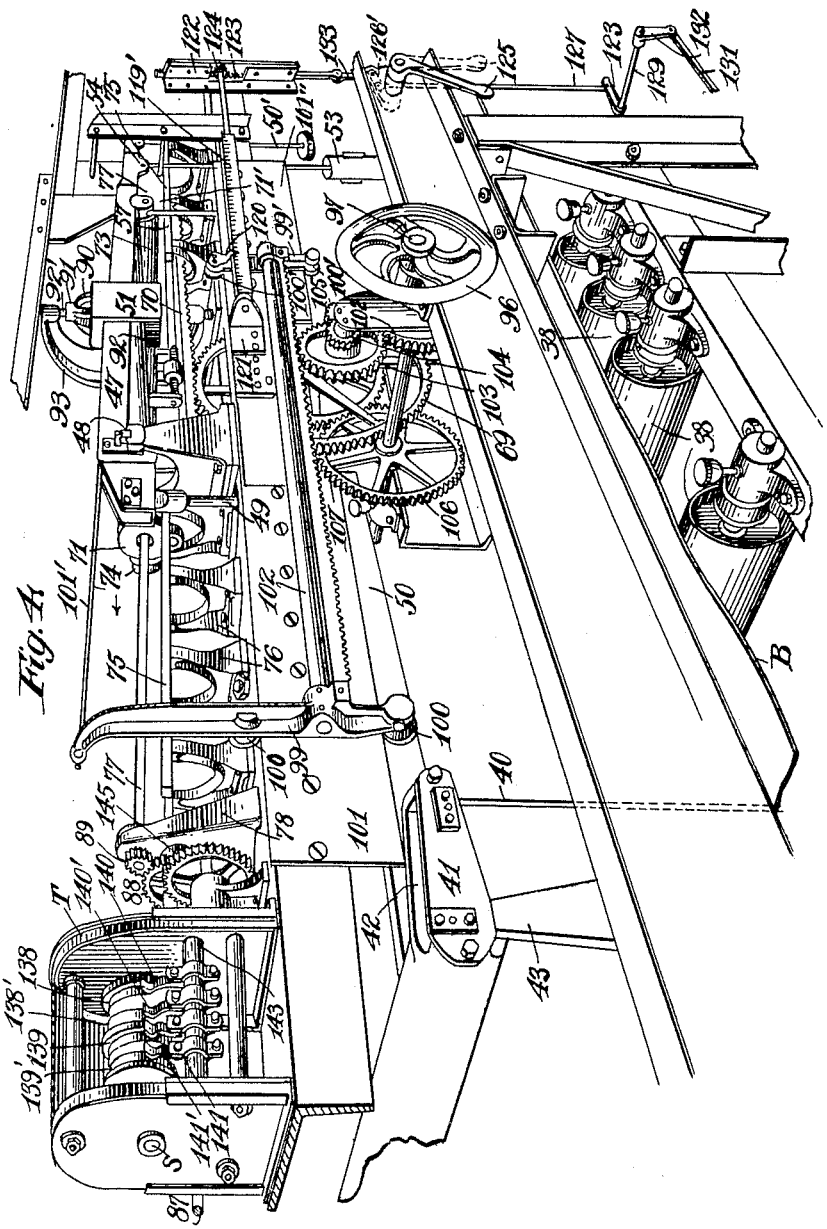

Sept. 10, 1929.  H. L. MERRICK  1,727,353
PROPORTIONAL MATERIAL FEEDING MEANS
Original Filed Aug. 13, 1924  9 Sheets-Sheet 3
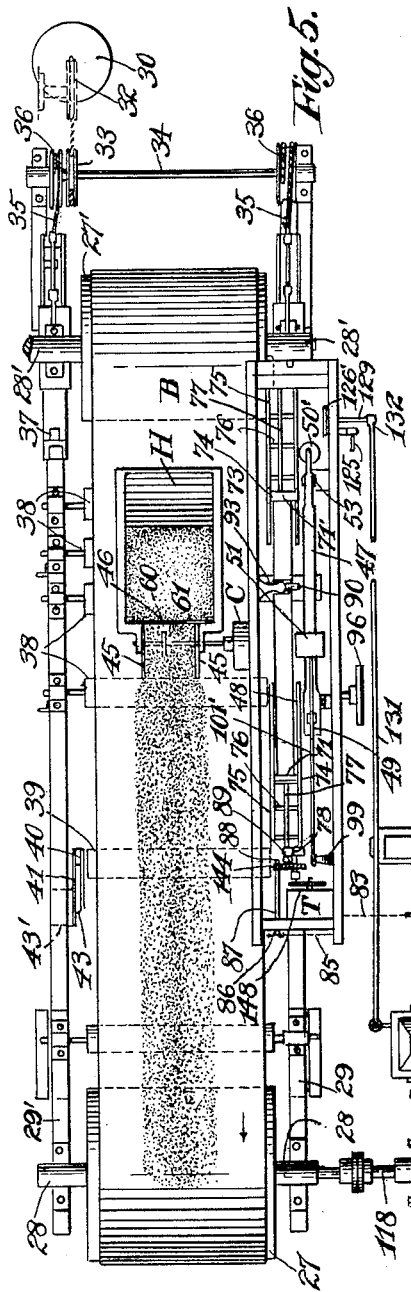
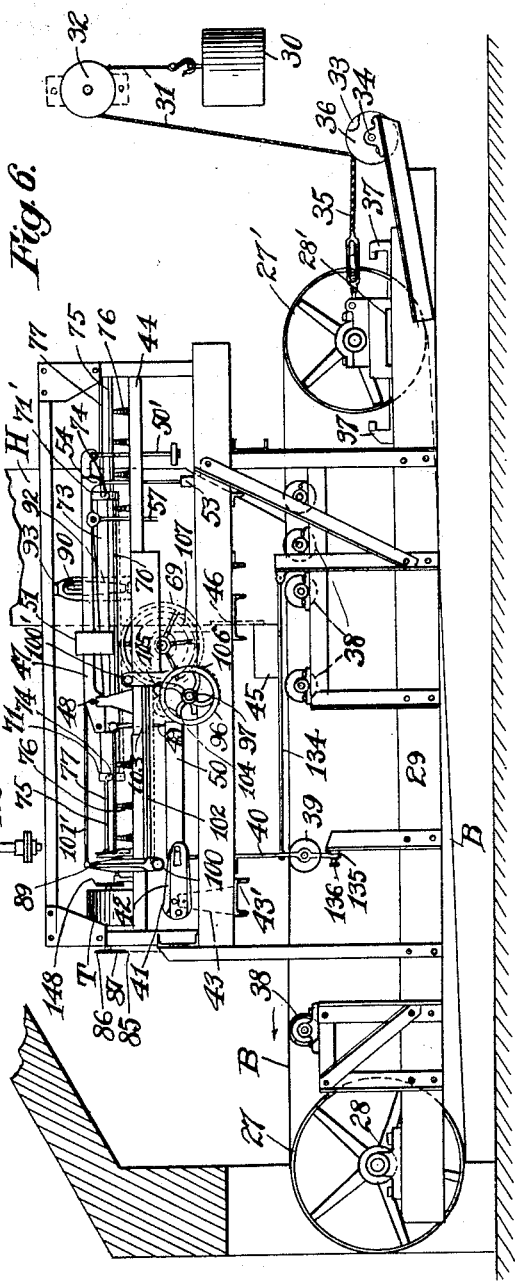
INVENTOR
H. L. Merrick.
By John O. Seifert
ATTORNEY Sept. 10, 1929.   H. L. MERRICK   1,727,353
PROPORTIONAL MATERIAL FEEDING MEANS
Original Filed Aug. 13, 1924    9 Sheets-Sheet 4
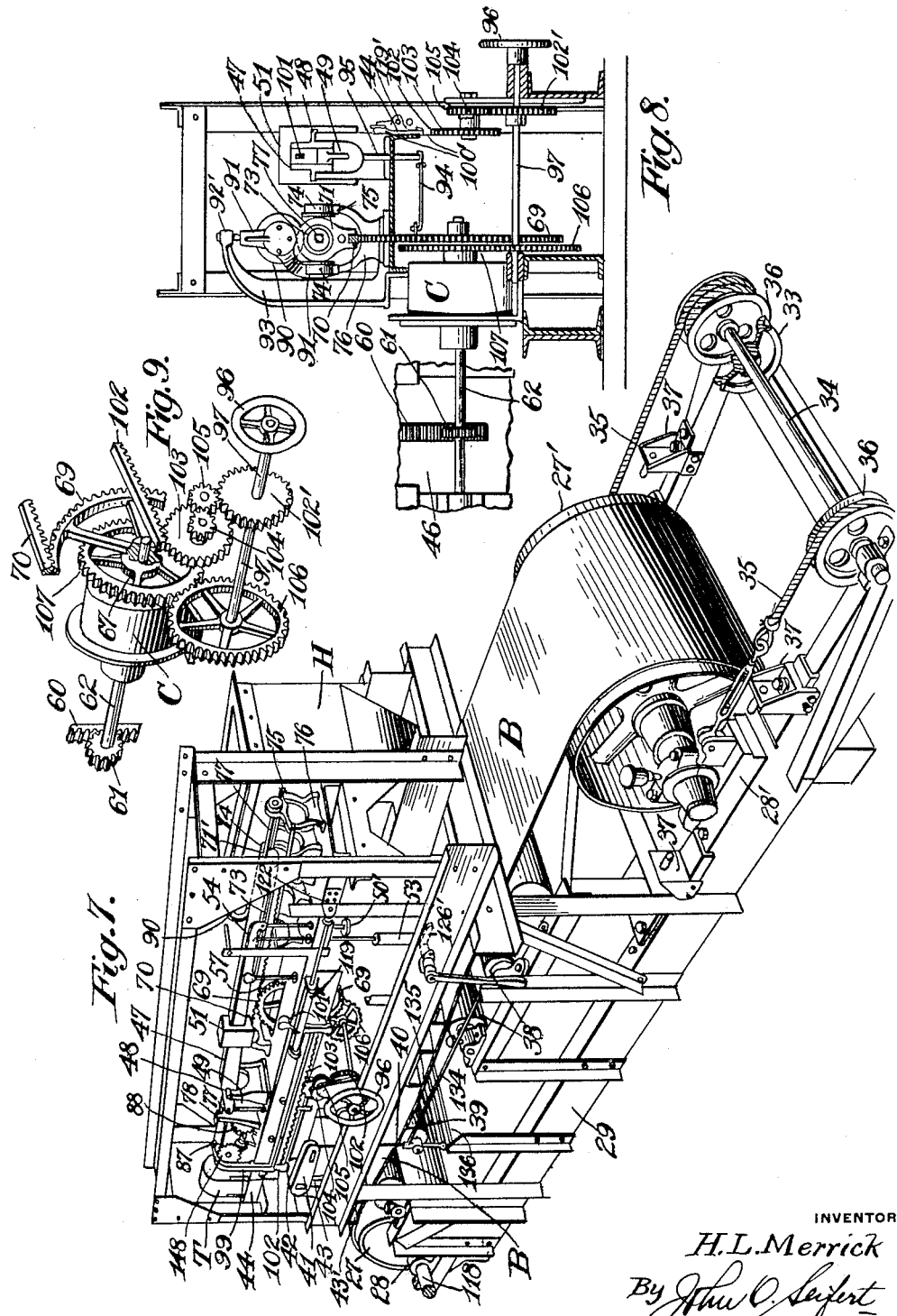
INVENTOR
H. L. Merrick
By John O. Seifert
ATTORNEY

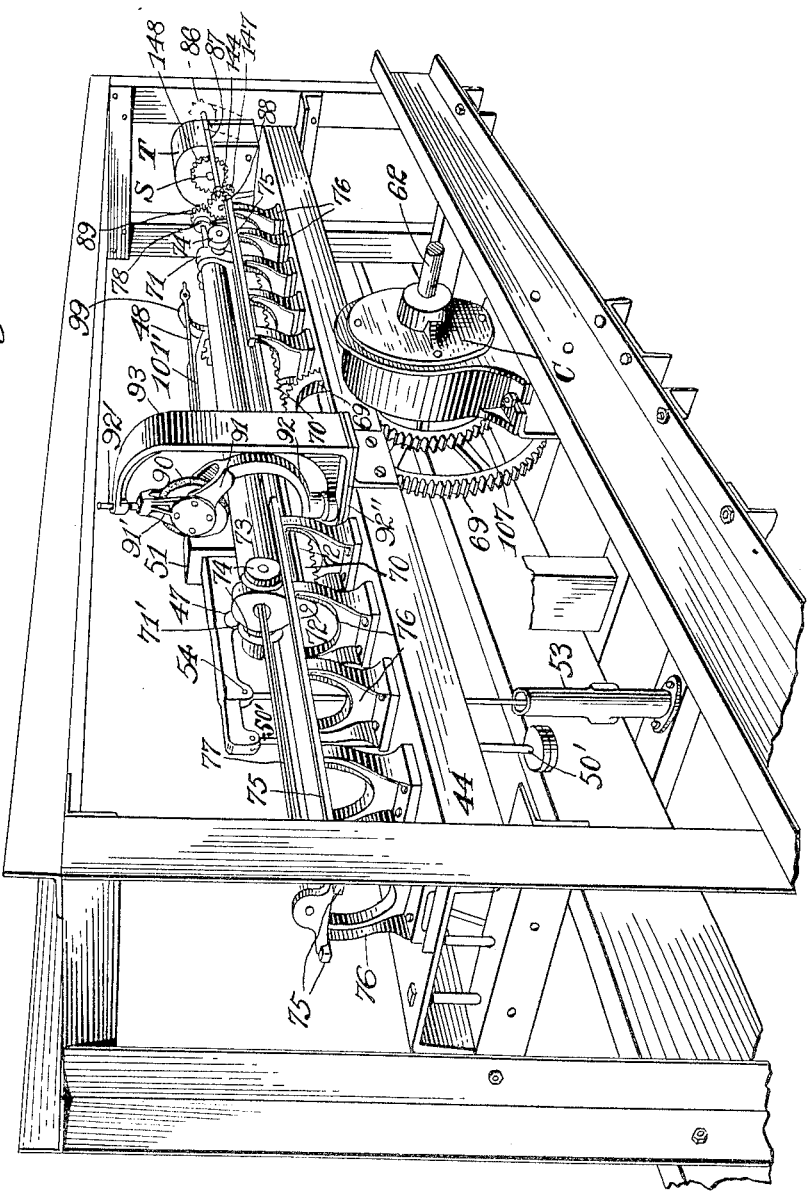

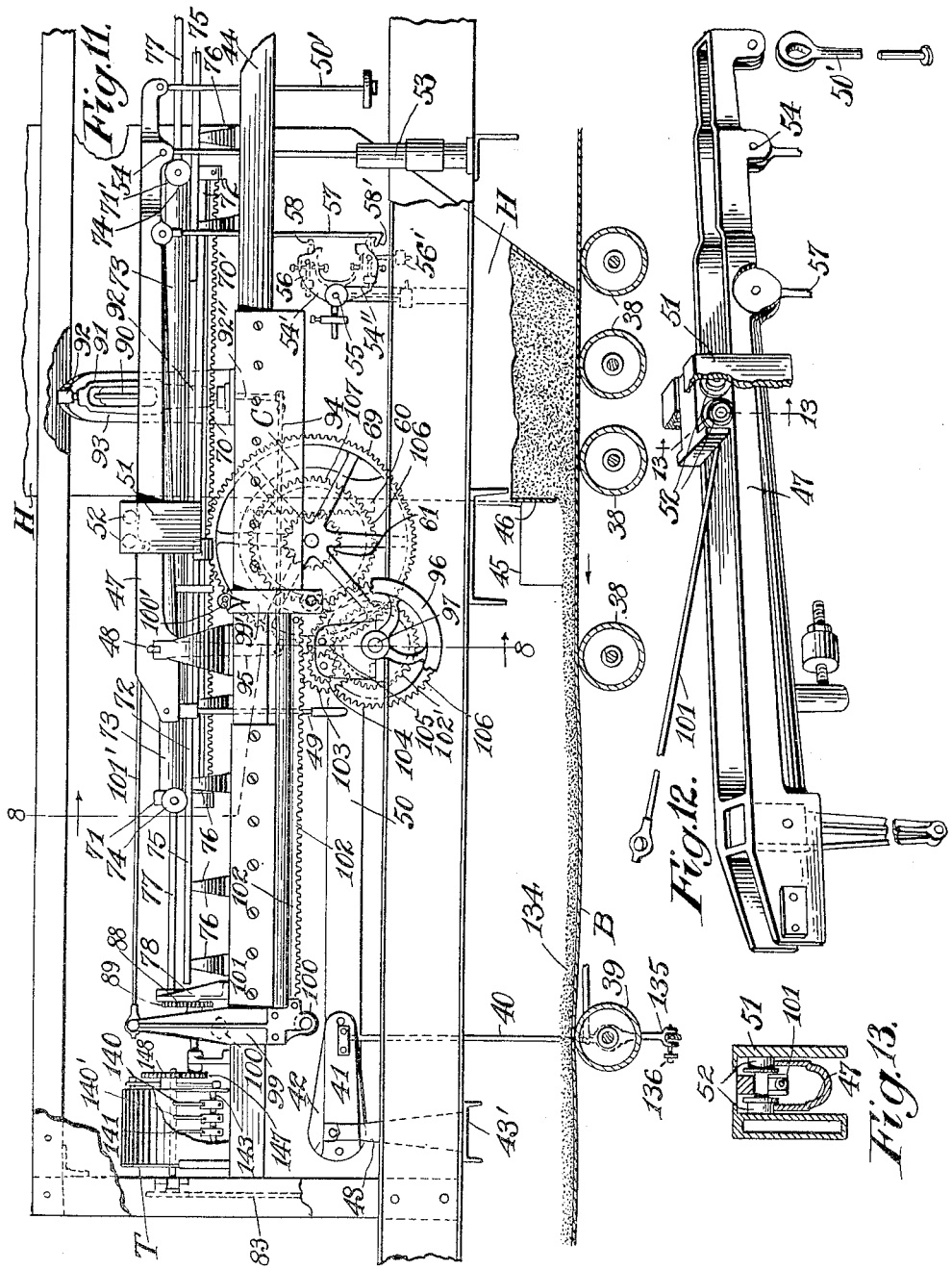

Sept. 10, 1929.  H. L. MERRICK  1,727,353
PROPORTIONAL MATERIAL FEEDING MEANS
Original Filed Aug. 13, 1924   9 Sheets-Sheet 7
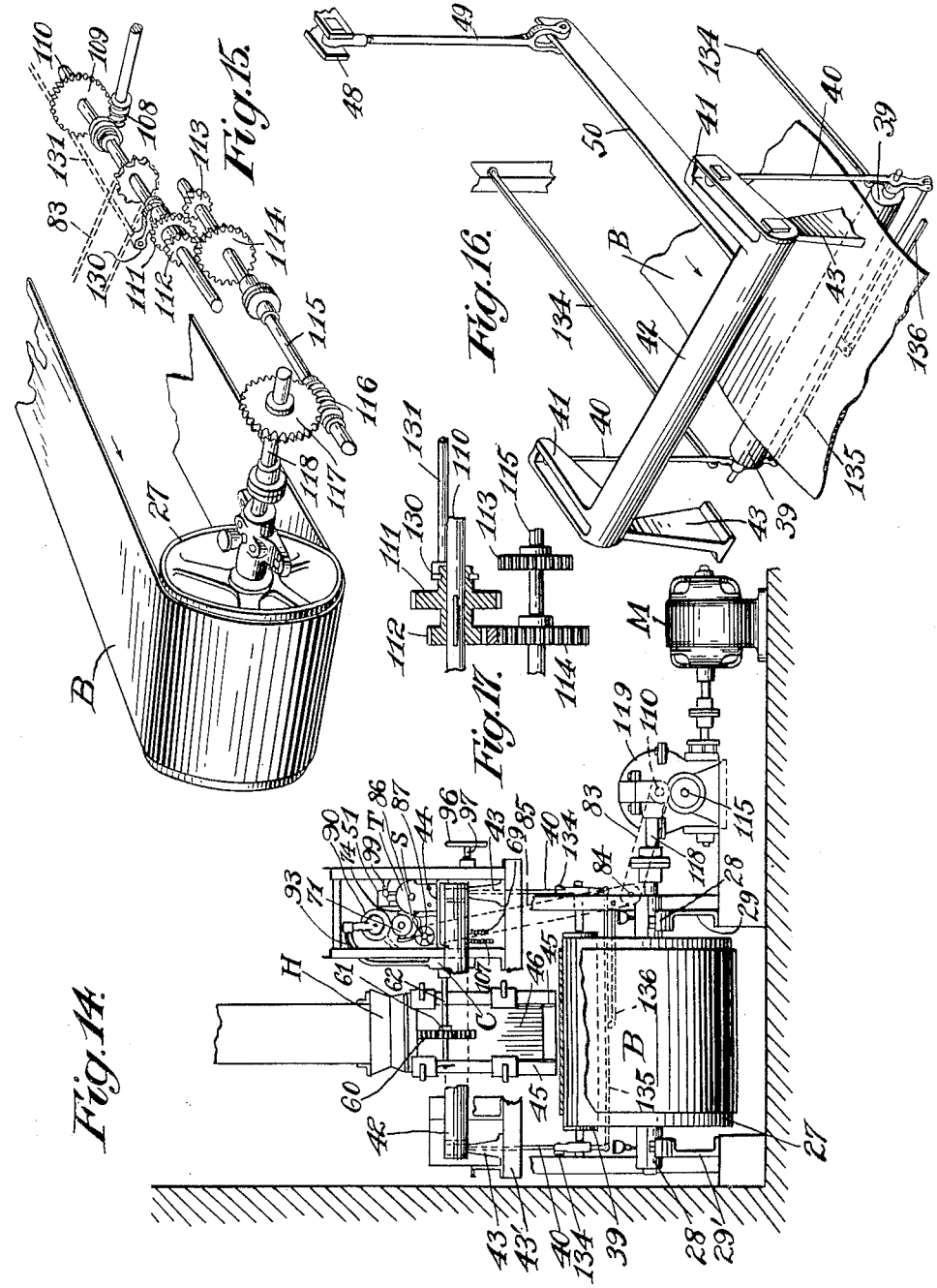
INVENTOR
H.L. Merrick
By John O. Seifert
ATTORNEY

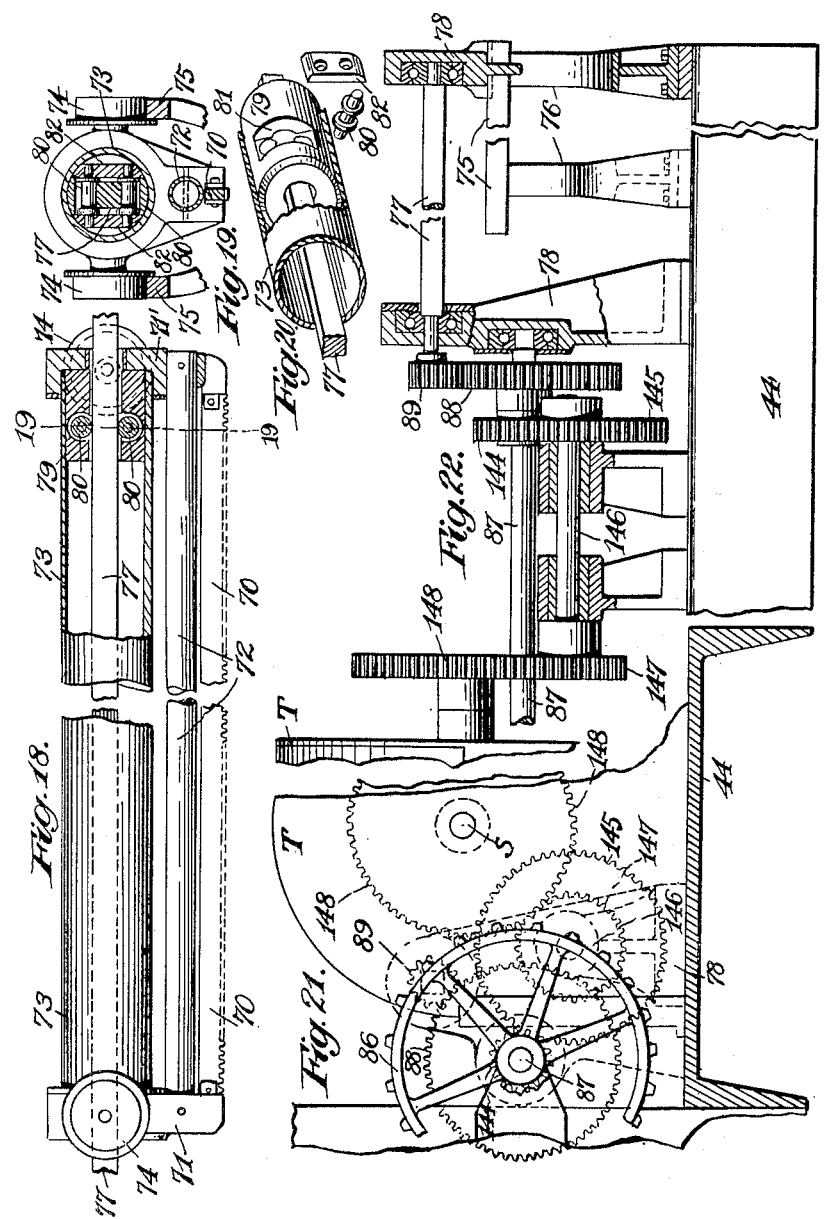

Sept. 10, 1929. H. L. MERRICK 1,727,353
PROPORTIONAL MATERIAL FEEDING MEANS
Original Filed Aug. 13, 1924   9 Sheets-Sheet 9
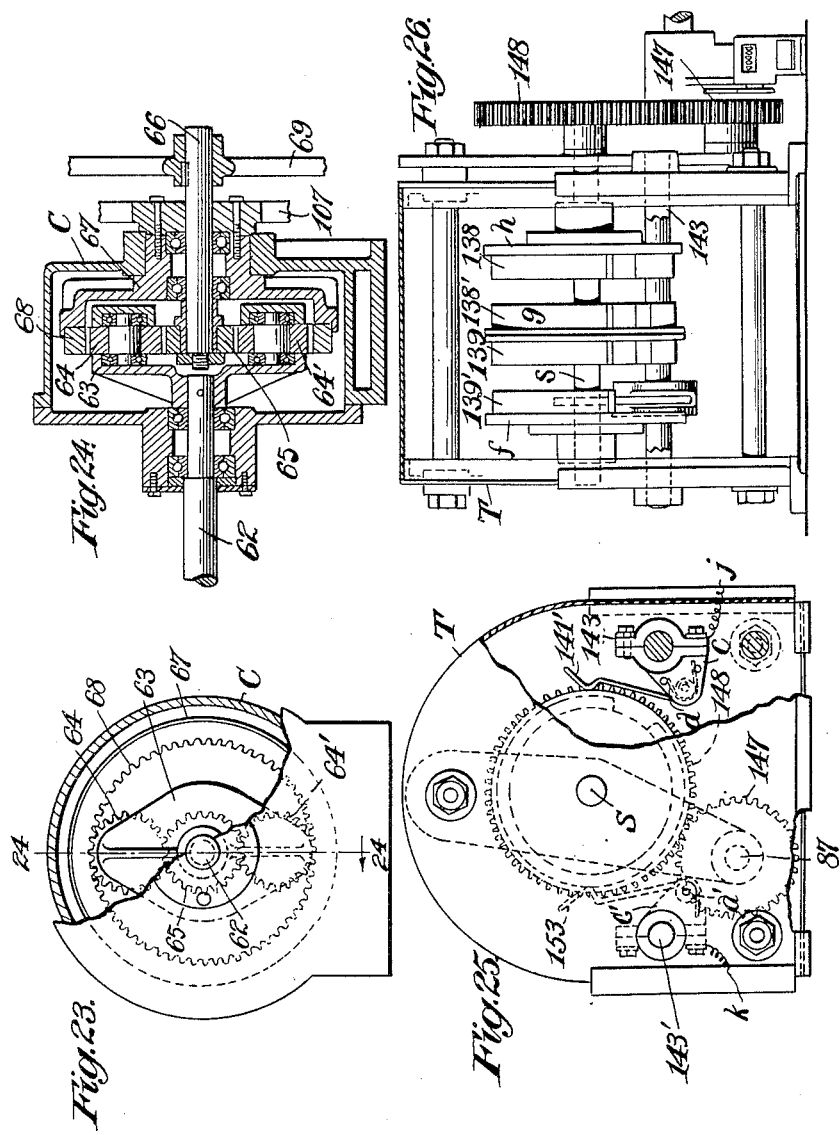

Patented Sept. 10, 1929.

1,727,353

UNITED STATES PATENT OFFICE.

HERBERT L. MERRICK, OF PASSAIC, NEW JERSEY.

PROPORTIONAL MATERIAL FEEDING MEANS.

Original application filed August 13, 1924, Serial No. 731,711. Divided and this application filed September 2, 1927. Serial No. 217,072.

This invention relates to means for feeding material in predetermined quantities, as by measure or weight, for use in feeding aggregates or component parts of a composition of matter or association of parts, such as the feeding of aggregates in cement making to a point or place where they are to be subjected to treatment to be reduced to a pulverized state, the present application being for subjects-matter of invention divided out from my co-pending application Serial #731,711, and it is the primary object of the invention to provide improved means for this purpose which is adapted to feed variable predetermined quantities of material at a constant rate or intermittently at predetermined intervals.

It is the main object of the invention to provide means for feeding materials from different sources of supply to a common place of use and the delivery of said materials in predetermined variable proportional quantities one relative to the other with means to control the delivery of one quantity of material by the delivery of a predetermined quantity of another material.

A further object of the invention relates to the provision in material carrying conveyors of means operable to control the quantity of material delivered by one conveyor in predetermined proportion to the quantity of material delivered by another conveyor.

It is a further object of the invention to provide material feeding means including a pair of conveyors and weghing mechanisms to determine the loads transported by the conveyors, with means to determine the load transported by one conveyor by the rate of speed of travel of the conveyor and the load transported thereby, and said means being operative when a predetermined quantity of material has been transported over the weighing mechanism to set another conveyor in operation, and the quantity of material transported by said latter conveyor being controlled by the load thereon by the weighing mechanism associated therewith, the quantity of material delivered by said latter conveyor being in predetermined proportion to the quantity of materal delivered by the first conveyor.

Other objects and advantages will hereinafter appear.

In carrying out the invention I provide a conveyor, such as an endless belt, to transport material delivered thereto from a suitable source, such as a hopper having an outlet arranged in superposed relation thereto, the material discharged from the hopper being regulated by an adjustable closure or gate to vary the area of the hopper outlet, and the adjustment of such closure being effected automatically by and in accordance with the load or quantity of material transported by the conveyor through a weighing beam arranged with means to support a portion of the conveyor, and the deflection of the weighing beam controlling means for positioning the closure for the hopper outlet to regulate the area of the hopper outlet.

To feed one material from a source of supply to the place of use in predetermined proportion to the feeding of another material from a source of supply to the place of use a second conveyor is provided arranged with weighing mechanism to suspend and support a portion of the conveyor therefrom, said conveyor preferably being driven at a constant rate of speed and the weight of the transported load determined by integrating means operative by the rate of speed of the conveyor and the load transported thereby, means being provided and set in operation when a predetermined quantity of material has been transported by the conveyor to set means in operation to actuate the other conveyor mechanism, and said means being operative to stop said conveyor mechanism after a predetermined length of travel of the conveyor.

In the drawings accompanying and forming a part of this specification there is shown an embodiment of the invention wherein Figure 1 is a plan view showing in a diagrammatic manner an installation of an embodiment of the invention including feeding apparatus for delivering one material at a predetermied constant rate, and a second feeding apparatus controlled from the first apparatus for delivering another material in predetermined proportional quantity to the quantity of material delivered by the first apparatus.

Figure 2 is a front elevation of weighing mechanism arranged to suspend and support a portion of one of the conveyors shown in Figure 1 and having combined therewith integrating means for determining the quantity of material transported by the conveyor by the rate of travel of the conveyor and the load carried thereby; and Figure 3 is a diagrammatic view of an electric circuit means controlled by the integrating means of one feeding means to control the actuation of a time switch mechanism and the actuating of another feeding means, and the delivery thereby of successive quantities of material in predetermined ratio to the delivery of material by the first feeding means.

Figure 4 is a perspective view looking at the side and from the front of the means for regulating the delivery of material to one conveyor to feed variable predetermined loads, only a portion of the conveyor means being shown.

Figure 5 is a plan view of the feeding means shown in Figure 4.

Figure 6 is a side elevation of the mechanism shown in Figure 5 with the driving means for the conveyor removed.

Figure 7 is a perspective view of the feeding means shown in Figure 4 looking at the side and rear.

Figure 8 is a cross sectional view taken substantially on the line 8—8 of Figure 11 looking in the direction of the arrows.

Figure 9 is a perspective view of the gearing shown in Figure 8 for adjusting the counterpoise relative to a weighing beam of the weighing mechanism and for adjusting the closure for the outlet of a hopper for delivering material to the conveyor.

Figure 10 is a perspective view looking at the rear and side opposite to that shown in Figure 7 with the conveyor and the hopper for delivering material to the conveyor removed.

Figure 11 is a side elevation of the mechanism shown in Figure 4 and showing in addition thereto the hopper for delivering the material to the conveyor and showing the manner of supporting a portion of the conveyor from a weighing beam.

Figure 12 is a perspective view of a weighing lever or beam from which to support a portion of the material carrying conveyor and showing in section counterpoise weight adjustably mounted on the beam for adjusting the same to counterbalance variable predetermined loads carried by the conveyor.

Figure 13 is a cross sectional view taken substantially on the line 13—13 of Figure 12 looking in the direction of the arrows.

Figure 14 is an end elevation looking at the left of Figure 5 and showing the conveyor in section.

Figure 15 is a perspective view of change speed gearing for driving the conveyor at different speeds.

Figure 16 is a perspective view to show the manner of suspending a portion of the conveyor from the weighing beam shown in Figure 12.

Figure 17 is a side elevation, partly in section, of the change speed gearing shown in Figure 15 to show the manner of meshing different gears to drive the conveyor at different speeds.

Figure 18 is a side elevation of a friction driven drum forming a part of means to adjust the closure from the outlet of the hopper from which material is delivered to the conveyor shown in Figure 11, the same being shown partly in section to show the mounting thereof on a shaft to permit of longitudinal movement of the drum while participating in the rotative movement of the shaft.

Figure 19 is a cross sectional view taken substantially on the line 19—19 of Figure 18 looking in the direction of the arrow.

Figure 20 is a dissembled view, partly in section, of the right hand end of the drum shown in Figure 18 to show the means and manner of mounting the drum upon its support and rotating shaft.

Figure 21 is an end elevation, partly broken away, to show the driving means for the drum carrying shaft shown in Figure 15 and to actuate a limit switch.

Figure 22 is a sectional view in side elevation of the driving means shown in Figure 21 looking at the right thereof and showing the drum supporting shaft.

Figure 23 is an end elevation, partly in section, of differential driving gearing forming a part of the gearing shown in Figure 9.

Figure 24 is a cross sectional view taken substantially on the line 24—24 of Figure 23 looking in the direction of the arrow.

Figure 25 is an end elevation of a time switch used in connection with the feeding means with a portion of the enclosing housing therefor removed.

Figure 26 is a side elevation of the limit switch shown in Figure 25 looking at the left of said figure with the enclosing housing therefor in section.

In carrying out the invention a feeding mechanism as shown in Figures 4 to 26, inclusive, is provided embodying a material handling way or conveyor comprising an endless belt B passing around drums 27, 27' journaled in bearings 28, 28' mounted on sills 29, to travel in the direction of the arrow, driving means, such as an electric motor M (Figure 14) being operatively connected with the drum 27. The drum bearings 28 are fixed while the bearings 28' are mounted for adjustment of the drum 27' toward and away from drum 27. The bearings 28' are urged in a direction away from the drum 27 by a counterweight 30 suspended from a cable 31 passing over a sheave 32 and connected to a sheave 33 fixed to a shaft 34 journaled in bearings upon the sills. The shaft 34 is connected by cables 35 connected through turn buckles to the bearings 28' and sheaves 36 on shaft 34, the movement of said drum bearings being limited by stops 37. By this arrangement the conveyor belt while maintained taut is permitted to have yielding movement to compensate for the movement of the load carrying portion of the upper stretch of the conveyor to prevent the possibility of introducing inaccuracies in the operation of the mechanism due to variations in the load transported by the conveyor and consequent pulling strain upon the conveyor. The upper conveyor stretch is also supported by rollers 38 with a portion of the conveyor intermediate a pair of said rollers suspended by a roller 39 carried by a pair of links 40 pivotally suspended from lever arms 41 rigid with a rocker bar 42 pivotally supported upon standards 43 (Figures 4, 5, 6 and 16) fixed upon a shelf 43' superposed to the conveyor. The arms 41 extend in parallel relation to and in a direction opposite to that in which the conveyor travels. The rocker bar 42, arms 41, links 40 and roller 39 form a part of means to counterbalance the load upon the conveyor.

The material is delivered to the conveyor from a hopper H having an outlet above the conveyor with guide boards 45 (Figures 5, 6 and 11) extending forwardly from said outlet within the lateral edges thereof to prevent material from spilling from the sides of the conveyor as the material is delivered from the hopper. An adjustable gate 46 regulates the area of the hopper outlet and discharge of material from the hopper.

To handle and feed a predetermined quantity of material by the conveyor, and to vary said quantity at will, the gate is automatically adjusted to vary the area of the hopper outlet and regulate the discharge of material from the hopper to handle a predetermined uniform quantity of material by the conveyor per unit of conveyor length for a given unit of time with a constant speed of travel of the conveyor and the load carried by the conveyor. For this purpose there is provided a lever 47, herein termed a weighing beam, fulcrumed at 48 upon the superstructure 44 connected at the shorter end to the rocker bar 42 by a link 49 connected to a lever arm 50 rigid with the rocker bar 42 and extending parallel to the arm 41 thereby suspending a portion of the load therefrom through the conveyor supporting roller 39 suspended from the rocker arms 41 by the links 40. The one end of the weighing beam may be arranged with a compensating weight support 50'. To counterbalance a load of predetermined weight upon the conveyor counterpoise weight 51 is adjustably mounted upon the beam, in the form of a carriage supported upon the beam by rollers 52, the beam being of U-shape in cross section with the edges of the opposite legs serving as tracks for the carriage rollers (Figure 12). To prevent undue vibration of the beam as it is brought to equilibrium a dash pot 53 is provided the movable member of which is connected at 54 to the beam, (Figures 4, 6, 10 and 11). To prevent undue deflection of the weighing beam by an overload or underload on the conveyor auxiliary counterpoise weight is provided normally free of the beam and adapted to be applied to or picked up by the beam, comprising a pair of counterweighted levers 54', 54'' pivotally supported at 55, the counterweight being so arranged as to normally assume a position below the center of gravity, (Figure 11), said levers carrying counterweighted levers 56, 56'. A rod 57 suspended from the weighing beam is arranged with a pair of hooks 58, 58', the hook 58 being adapted to pick up and apply the supplemental counterpoise with the lever 56 to the beam and through said lever upon further deflection of the beam apply the auxiliary counterpoise weight lever 54' to the beam when the beam is deflected downward or to underload position, while the hook 58' is adapted to pick up and apply the supplemental counterpoise weight lever 56' to the beam and through said lever apply the auxiliary counterpoise weight lever 54' to the beam when the beam is deflected upward or to overload position. It will be obvious that as the beam is brought to equilibrium it will be relieved of the weight of said auxiliary and supplemental counterpoise weight. The position of the counterpoise weight 51 upon the weighing beam is in accordance with the required or determined quantity of material to be handled or fed by the conveyor to counterbalance such load, and the quantity of material to be fed by the conveyor may be variable and changed at will by the adjustment of said counterpoise upon the beam.

To maintain the load transported by the conveyor at a constant predetermined value to counterbalance the weight of the counterpoise upon the beam, the position of which counterpoise weight upon the beam is in accordance with the weight of such predetermined load, means are provided to adjust the gate 46 for the hopper outlet to vary the area thereof to increase or decrease the discharge of material from the hopper to the conveyor by a variation in the load transported by the conveyor and the moving of the weighing beam out of equilibrium by an underload or overload upon the portion of the conveyor supported by said beam. This means comprises a rack 60 fixed to the gate 46 to extend in a vertical direction and meshing with a pinion 61 fixed to a shaft 62 of differential gearing carried in a housing or casing C (Figures 23 and 24) fixed upon the framework and in which casing the shaft 62 is journaled and has a head 63 fixed thereto within the casing, said head carrying a pair of pinions 64, 64' to rotate on axes arranged eccentric to the axis of the shaft 62 and diametrically opposite to each other, said pinions meshing with a pinion 65 fixed to a shaft 66 journaled coaxially with the shaft 62 in the hub of a head 67 rotatably supported in the casing in concentric relation to said shaft, said head carrying an internal gear 68 with which the pinions 64, 64' also mesh for the purpose of allowing a hand wheel to simultaneously adjust the gate of the hopper outlet and the counterpoise weight on the scale beam as fully described hereinafter. A gear 69 fixed to the shaft 65 meshes with a rack 70 fixed at opposite ends to a pair of heads 71, 71' connected in spaced relation to a connecting member 72 (Figure 18), said heads and connecting member constituting a carriage for a drum 73 supported at opposite ends in the carriage heads to have rotative movement. Each carriage head rotatably carries flanged rollers 74 whereby the carriage with the drum is mounted upon rails 75 carried by standards 76 (Figure 8) to have to and fro longitudinal movement which is transmitted to the gate for adjusting the gearing.

To permit of rotative and simultaneous longitudinal movement of the drum it is mounted on a shaft 77 of rectangular shape in cross section journaled at opposite ends in standards 78. This shaft extends through the drum and the drum is mounted concentrically thereon by heads 79 fixed in the ends of the drum and the drum rotatably supported in the carriage heads 71, 71', said heads carrying antifriction bearings for longitudinal movement of the drum upon the shaft, consisting of flanged rollers 80, a pair of said rollers engaging at opposite sides of the shaft at each end thereof with the rollers at one end of the drum arranged in angular relation to the rollers at the opposite end of the drum. The rollers 80 are mounted in opposite recesses 81 in the heads 79 and retained therein by releasable caps 82 (Figure 20). The drum is rotated from the motor M by a sprocket chain 83 (Figures 5, 11, 14, 15, 21 and 22) passing around sprocket wheels on a drive shaft 110 and a shaft 84, and a sprocket chain 85 passing around a second sprocket wheel on shaft 84 and a sprocket wheel 86 on a shaft 87 with a gear 88 on said latter shaft meshing with a pinion 89 on the drum carrying shaft 77.

The adjustment of the gate 46 for the hopper outlet is effected through the longitudinal movement of the drum rack 70 with the drum meshing with the gear 69 connected with the gate through the differential gearing in gear casing C, and longitudinal movement of the drum is effected by the moving of the weighing beam out of equilibrium by an underload or overload on the conveyor and maintained against movement when the beam is in equilibrium. This longitudinal movement of the drum is effected by a disk 90 frictionally contacting with the drum (Figures 4, 5, 6, 8, 11 and 14), said disk being mounted in a bifurcation 91 of a yoke shaped carrier 92 to rotate on a horizontal axis, the disk carrier having oppositely extending studs 92', 92" (Figures 10 and 11) whereby it is mounted in portions of a bracket 93 overhanging and extending below the drum. The disk is maintained in contact by gravity with and frictionally driven from the drum. When the disk is traveling at right angles to the drum it will hold the drum against longitudinal movement, and when travelling in angular relation to the axis of the drum it will exert a thrust upon the drum to move it axially, the direction of movement of the drum being in accordance with the angular relation of the disk to the drum. To effect changes in the direction of travel of the disk by the deflection of the beam it is connected with the beam by a link 94 pivotally connected at one end with the stud 92" of the disk carrying yoke and with a rigid arm 95 extending downward from and in line with the pivotal support of the beam. Should there be an overload upon the conveyor thereby deflecting the weighing beam upward the friction disk will be adjusted to travel in a direction in angular relation to the axis of the drum to exert an axial thrust upon and move the drum axially in the direction of the arrow indicated in Figures 4, 5 and 9, and through the gear connection adjust the gate to reduce the area of the hopper outlet and a consequent reduction in the discharge of material from the hopper to the conveyor, such adjustment of the gate being continued until the load on the conveyor brings the weighing beam to equilibrium. When the load on the conveyor is under a predetermined weight, determined by the position of the counterpoise weight upon the beam, and the beam is deflected downward the friction disk will be adjusted to travel in a direction in angular relation to the drum to cause it to move in a direction opposite to that indicated by the arrow, adjusting the gate for the hopper outlet to increase the area of the outlet and an increased discharge of the material from the hopper to the conveyor, which is continued until the beam is brought into equilibrium by the load upon the conveyor. From the foregoing it will be obvious that a load of a predetermined weight will be constantly fed and delivered by the conveyor, and the weight of the load and the quantity of material fed by the conveyor will be in accordance with the position of the counterpoise weight upon the weighing beam.

Means are provided to simultaneously adjust the counterpoise weight upon the beam and the gate for the hopper outlet to vary the area of said outlet in proportionate relation to the position of the counterpoise upon the beam, comprising a hand wheel 96 (Figures 4 to 9) fixed to a shaft 97, operatively connected to a counterpoise adjuster comprising a vertical arm 99 carrying flanged rollers 100 engaging upon a slideway 101 to have movement in a direction longitudinally of the weighing beam, the arm 99 being connected to the counterpoise by a rod 101'. Movement of the counterpoise adjuster along the slideway 101 is effected through the rotation of the hand wheel 96 by a rack 102 connected at the ends to the arm 99 and a head 99' mounted by rollers 100' upon a slideway 101'', the rack being connected to the hand wheel by a gear 102, fixed to shaft 97, a gear 103 in mesh with the rack and intermediate pinions 104, 105 meshing with the gears 103 and 102' respectively. As the hand wheel is rotated to the right the counterpoise will be adjusted to the right on the beam, and when rotated in reverse direction it is adjusted in the opposite direction. To simultaneously adjust the gate for the hopper outlet there is provided a gear 106 on a shaft 97 which meshes with a gear 107 fixed to the hub of the pinion carrier 67 in casing C (Figure 24), whereby the rotation of the shaft 62 carrying pinion 61 in mesh with the gate rack 60 is effected.

To effect variations in the rate of speed of travel and in the load handled by the conveyor, variable speed driving means is provided, (Figures 15 and 16) comprising a worm 108 on the shaft of motor M meshing with a worm wheel 109 on the shaft 110. A gear 111 and pinion 112 are mounted on shaft 110 to rotate therewith and have movement along the shaft in unison and adapted to be meshed with a pinion 113 and a gear 114, respectively, on a shaft 115. When pinion 112 is in mesh with gear 114 gear 111 will be out of mesh with pinion 113, and vice versa. The shaft 115 is connected to the conveyor drum 27 by a worm 116 meshing with a worm wheel 117 on a shaft 118 having a flexible coupling with the drum shaft. The reducing gearing may be enclosed in a housing 119 as shown in Figure 5.

The weight of the material fed by the conveyor per unit of length of travel of the conveyor is indicated on a scale beam 119' relative to which an indicator 120 is moved simultaneously with the adjustment of the poise weight 51, this indicator being mounted upon the head 99' to participate in the movement imparted thereto through the operation of the hand wheel 96. It will be obvious that when the conveyor is traveling at one rate of speed the quantity of material fed will be different than when the conveyor is traveling at another rate of speed, and a multiple calibrated or graduated scale beam is therefore provided. For this purpose the scale beam 119' is of rectangular shape in cross section and pivotally supported at opposite ends in brackets 121, 122 fixed to the framework, the bracket 122 also being arranged to slidably support a rack 123 with which a pinion 124 carried by the scale beam meshes. While calibrations may be arranged on the four sides of the scale beam, where only two changes in the rate of speed of travel of the conveyor may be effected, as in the present instance only two of the sides are calibrated. The change speed gears 111, 112 are adjusted by a hand lever 125 to the support of which an arm 126' is fixed connected by a link 127 to an arm 128 of a rock shaft 129 (Figure 4) to which a shifter 130 (Figure 15) for the change speed gears 111, 112 is connected by a rod 131 connected to a second arm 132 on said rock shaft. To effect simultaneous adjustment of the scale beam 119' the rack 123 is connected by a link 133 to the arm 126'.

To hold the conveyor supporting roller 39 from movement in a direction longitudinally of the conveyor as the conveyor travels thereover with the possibility of exerting strains upon the weighing beam other than those effected by the load upon the conveyor a pair of restraining links 134 are provided connected to the links 40 and a fixed part of the framework (Figure 16). To prevent side swaying of said roller 39 the links 40 are extended beyond their connection with the roller and connected by a rod 135, connected intermediate its ends to one end of a rod 136 the opposite end of which rod is connected to a fixed part of the framework.

To feed material in predetermined quantities by the conveyor B proportional to another quantity of material fed by another conveyor means are provided to intermittently actuate said conveyor B, which is effected by opening the circuit of the driving motor M to stop the conveyor after a predetermined length of travel thereof. In Figure 1 there is diagrammatically illustrated feeding mechanism for this purpose wherein the one feeding means hereinbefore described is represented in a general way at D to deliver material to a place of use, indicated as a bin E, and in feeding material to constitute one of the aggregates in cement making leading to a disintegrating apparatus. (Not shown.) To feed another material or materials to the bin E a second traveling conveyor is provided, designated in a general way by F and as of the belt type. The source of supply from which the material is delivered by said conveyor is illustrated as railway cars G from which the material is delivered to a hopper I having an outlet arranged to deliver the material to the conveyor F.

The intermittent actuation of the conveyor mechanism D is controlled by the quantity of material fed by the conveyor F whereby to feed material by said conveyor D proportional to the quantity of material fed by the conveyor F. For this purpose means are provided to determine the quantity of material fed by the conveyor F, which means is operative by the rate of speed of travel of the conveyor and the load transported thereby. This means comprises a mechanical integrator of the type disclosed in Patent No. 954,870 granted to me April 12th, 1910, and illustrated in a conventional manner in Figure 2 and represented by J in Figure 1. As the construction and operation of this integrator mechanism is fully illustrated and described in my said patent detailed illustration and description is not deemed to be necessary. This integrator includes a traveling element in the form of a belt, driven at the same rate of speed as the conveyor, and a rotary carrier in the form of a disk 137 carrying a series of integrating wheels upon its periphery to successively frictionally engage the traveling element and the mounting for said carrier being arranged to adapt the carrier to turn in a plane parallel to the friction surface with mechanism to register the revolutions of the disk or carrier for the integrating wheels. When the disk has made a complete revolution a predetermined quantity of material will have been fed by the conveyor. The feeding means D is adapted to feed a predetermined quantity of material which is proportional to the quantity of material fed by the feeding means F, and the feeding of material by the feeding means D is controlled by the quantity of material fed by the feeding means F. For this purpose a time switch is provided to control the actuation of a switch, designated in a general way at T, for connecting the motor M into and cutting it out of circuit with a source of electricity, the time switch being connected in circuit with electric circuit closing means forming a part of the integrator of the feeding means F. The circuit for closing the circuit of the time switch is diagrammatically illustrated in Figure 3.

The time switch mechanism comprises a series of three disks $f, g$ and $h$ of insulator material, such as fibre, and two pairs of contact heads 138, 138' and 139, 139', the heads 138, 138' being electrically connected and the heads 139, 139' also being electrically connected. Each of said heads with the exception of head 139' is undercut or recessed at diametrically opposite points (indicated at $h'$ in Figure 3) to provide each of said heads with what is in effect diametrically oppositely arranged contact terminals; the head 139' has more than one-half of its circumference reduced to arrange said head in effect with a single contact terminal portion $i$. The contact head carrying disks are mounted on a shaft $s$ rotatably supported in the walls of an enclosing housing for said switch mounted upon the supporting shelf 44 for the weighting beam. Contact terminals 140, 140' and 141, 141' are pivotally carried by bracket $c$ fixed to and insulated from a bar 143 and yieldingly urged by springs $d$ in a direction to contact with the head terminals $h'$ to have rubbing contact therewith as clearly shown in Figure 25. The contact carrying shaft $s$ is driven from the shaft 87 which is geared to and drives the drum rotating shaft 77 by a pinion 144 on the shaft 87 meshing with a gear 145 on a shaft 146 and having a pinion 147 fixed thereon meshing with a gear 148 on shaft $s$. The integrator disk 137 has a terminal contact 149 connected in circuit with a source of current supply, such as a battery represented in a conventional manner at $b$ and with which contact one of a pair of terminal contacts 151, 152 arranged diametrically opposite the axis of the integrator disk are adapted to contact. The contact 152 is electrically connected to the contact maker 141' by conductor $j$, while the contact 151 is electrically connected through conductor $k$ to a contact maker 153 pivotally carried by a bracket $c'$ fixed on and insulated from a bar 143' and urged to position in predetermined relation toward the contact head 139' by a spring $d'$, said contact 153 being adapted to co-operate with the terminal $i$ of contact head 139' to close the circuit. The contact 141 is connected to one side of the source of current supply $b$ by conductor $l$, the contact 149 of the integrator wheel being connected to the other side of the battery by a conductor $m$ with an actuating coil 154 for a circuit closer 155' interposed therein. The circuit closer 155' is interposed in a conductor 156 connected to contact 140' and conductor $m$ having a coil 157 of an electromagnetically operated circuit closer 157' interposed therein, said circuit closer being connected in the circuit of the motor M with a source of electric current supply. The contact 140' is electrically connected through conductor $l$ with the source of current supply $b$, shown in the present instance for illustrative purposes through the contact 141 to conductor $n$. The circuit of the time switch is adapted to be closed upon each one-half revolution of the integrator wheel 137. Assuming that five hundred pounds is to be fed by the feeding means D to each two thousand pounds fed by the feeding means F. Also assuming that contact is made between the contact head 139 and contact 141 as two thousand pounds is transported over the integrator by the feeding means F when contact head 149 of the integrator wheel will be brought into contact with contact 152 closing the circuit for the time switch through the conductor $l$, $m$ and contact 141 which is in contact with contact head 139, the latter as heretofore stated being electrically connected with contact head 139', the closing of the circuit energizing coil 154 which actuates circuit closer 155' through contact 140' and the connection of the latter with the battery $b$ by conductor $n$, $l$ and 156 thereby actuating the circuit closing means 157, 157' and connecting the motor M in circuit with a source of electricity which motor operates the feeder means B, and as the limit switch is actuated from said motor the switch will be actuated until the contact heads 138', 138, and 139' are positioned with the contacts 140', 141 and 141' engaging the undercut portions in said contact heads and out of contact therewith opening the circuit through coil 154 when circuit closer 155' will move to circuit opening position, shown in full lines. In order that the circuit may not be broken with a consequent stopping of the motor M when the contact 149 of the integrating wheel moves out of contact with contact 152 and before the limit switch has completed a one-half revolution, a holding circuit is provided which is in the nature of a shunt circuit connected in circuit with the conductors $l$, $m$, and comprising a conductor $o$ connected with the conductor $m$ at one treminal of coil 154 and with the contact 140 which co-operates with the contact head 138, which, as stated, is electrically connected with the contact head 138', the conductor $o$ being connected through said head and the contact 140' as hereinbefore described with the conductor $l$. The conductor $o$ has a circuit closer 155 connected therein which is connected with the circuit closer 155' to be actuated in unison therewith by the coil 154. This holding circuit will be broken simultaneously with the opening of the circuit through the contact heads 140', 141 and 141' by contact 140 coming opposite to an undercut portion of the contact head 138.

Should the integrating mechanism stop with the contact 149 in contact with contact 152 there will be no repetition of the feeder mechanism B since upon the completion of a one-half revolution of the time switch contact heads contact will be broken through conductor 141' with the terminal contact $i$ and and contact head 138'.

Upon the feeding or delivery of a successive two thousand pounds by the feeding means F the integrator wheel 137 will be advanced a further one-half revolution bringing the contact 149 into contact with contact 151 connected by conductor $k$ with contact 153 when the circuit will be established through contact $i$ of contact head 139' and contact 153 and the time switch in circuit with the conductor $m$ when the circuit of the motor M is again established in a manner as hereinbefore described. The establishing of the circuit in this manner is permissible since the area of the contact terminal portion $i$ of contact head 139' is such that as it passes out of contact with contact 141' it is approaching contact 153 and sufficient momentum is given to the feeder mechanism B even after the circuit of the driving motor M is broken to bring said contact terminal $i$ into contact with the contact 153.

The travel of the conveyor of the feeder D is so timed with relation to the rotation of the time switch, and the delivery of the material through the hopper H to the conveyor B is so regulated by the positioning of the closure gate for the hopper outlet by the load upon the conveyor B so that five hundred pounds of material will be fed during the interval of actuation of said feeding means. The travel of the conveyor of feeding means F is continuous and during the feeding of material by feeder D material fed by the feeding means F will actuate the integrator and after two thousand pounds has been fed the feeding means D will again be set in operation in a manner as above set forth.

While I have illustrated and described one embodiment of carrying out the invention it is to be understood that the construction and arrangement of parts may be variously modified, and that portions of the invention may be used without others and come within the scope of the invention.

Having thus described my invention I claim:

1. The combination of a pair of traveling conveyers, means to deliver material to said conveyers to be transported thereby, and means controlled by the transporting of a predetermined quantity of material by one conveyer to control the actuation and delivery of material by the other conveyer.

2. The combination of a plurality of traveling material carrying conveyers, means to deliver material to said conveyers from different sources of supply to be transported to a common place of use, means to intermittently actuate and control the delivery of material to one conveyer to deliver successively a predetermined quantity of material by said conveyer, and means to control said actuating means for the one conveyer operative from another conveyer upon the delivery of a predetermined quantity of material by said latter conveyer.

3. The combination of a pair of traveling material carrying conveyers, and means operative to deliver material by one of said conveyers in predetermined proportion to the material delivered by the other conveyer controlled by the quantity of material transported by said latter conveyer.

4. In material feeding means, a material carrying conveyer traveling at a constant speed, a second traveling material carrying conveyer, actuating means for said conveyers, and means operative upon the transporting of successive predetermined quantities of material by the first conveyer to render the actuating means for the second conveyer active and said means operative upon a predetermined travel of the second conveyer to render the actuating means therefor inactive to deliver material by one conveyer in predetermined proportional quantities to the material delivered by the other conveyer.

5. In material feeding means, a pair of conveyor mechanisms, means intermittently operative to impart successive predetermined lengths of travel to one conveyor to deliver successive predetermined quantities of material thereby, and means controlled by the delivery of a predetermined quantity of material by the other conveyor operative to render the operating means for the first conveyor active and the delivery of material by the first conveyor in predetermined proportion to the delivery of material by the second conveyor.

6. In material feeding means, a pair of conveyers, one of which conveyers travels at a constant speed, means operative to intermittently actuate the other conveyer, and means operative when a predetermined load has been transported by the conveyer traveling at a constant speed rate to set the other conveyer in operation.

7. In material feeding means, a pair of conveyers one of which conveyers travels at a constant speed, operative means to intermittently actuate the other conveyer, means operative when a predetermined load has been transported by the conveyer traveling at constant speed to start the actuating means for the other conveyer in operation, and means operative through the weight of the material transported by the latter conveyer to control the delivery of material by said conveyer during the periods of travel thereof.

8. In material feeding means, a conveyer traveling at a constant speed, a second conveyer, intermittently operative means to actuate the second conveyer and impart a predetermined length of travel thereto, means operative from the first conveyer when a predetermined quantity of material has been transported thereby to render the actuating means for the second conveyer active, and means operative from the actuating means for and controlled by the load transported by said second conveyer to maintain the quantity of material delivered thereby in predetermined proportion relative to the quantity of material transported by the first conveyer.

9. In material feeding means, a pair of conveyers one of which conveyers travels at a constant speed, intermittently operative means to actuate the other conveyer, means operative by the rate of speed of travel and the load transported by the first conveyer to render the actuating means for the intermittently operative conveyer active, and means actuated from said actuating means to render the actuating means inactive when a predetermined unit of travel has been imparted to said conveyer.

10. In material feeding means, a conveyer traveling at a constant speed, a second conveyer, means to deliver material to said conveyer, an electric motor having a driving connection with the second conveyer in circuit with a source of electricity having circuit opening and closing means interposed in the circuit normally urged to circuit opening position, actuating means for said circuit opening and closing means, a time switch connected in an open local circuit with said actuating means for the circuit opening and closing means, and means actuated from the first conveyer operative when a predetermined quantity of material has been transported by said conveyer to close the circuit of the driving motor for the second conveyer through the time switch for the purpose specified.

11. In material feeding means, a material carrying way traveling at a constant speed, a second material carrying way, means to deliver material to said ways, an electric motor for driving said second way having circuit opening and closing means normally urged to circuit opening position connected in the circuit thereof with a source of electricity, actuating means for said circuit closing and opening means, a time switch operative from the motor connected in a normally open local circuit with said actuating means for the first way operative when a predetermined quantity of material has been transported by said way to close the circuit of the time switch and render the actuating means for the circuit opening and closing means in the motor circuit operative to close said circuit, said time switch being operative upon a predetermined unit of travel of the second way to render the actuating means for the circuit opening and closing means in the motor circuit inactive, and means to regulate the delivery of material to said second way from the means to deliver material thereto and deliver material by said way in predetermined proportion to the quantity of material delivered by the first way.

12. In material feeding means, a conveyer traveling at a constant speed, a hopper having an outlet arranged to deliver material to said conveyer, a second conveyer, a second hopper having an outlet arranged to deliver material to said second conveyer and having an adjustable gate to vary the hopper outlet, integrating means associated with the first conveyer operative by the rate of speed of travel and the quantity of material transported by said conveyer to determine the quantity of material delivered by said conveyer, an electric motor having a driving connection with the second conveyer, means including a time switch to normally maintain the motor circuit open, means operative by the integrating means when a predetermined quantity of material has been transported by the first conveyer to render the time switch active to close the circuit of the motor, and said switch being operative to open the motor circuit after a predetermined length of travel of the second conveyer, and means operative by the load transported by the second conveyer to adjust the gate for the hopper outlet to regulate the discharge of material to the conveyer, and the delivery of material by said conveyer constant.

13. In material feeding means, a traveling conveyor, a hopper having an outlet arranged to deliver material from the hopper to the conveyor, weighing mechanism suporting a section of the conveyor, means controlled from the weighing mechanism to regulate the delivery of material from the hopper to the conveyor proportional to the rate of travel of the conveyor, and said conveyor being normally inactive, driving means having an operative connection with said conveyor, a second conveyor, means operative upon the transporting of a predetermined quantity of material by said latter conveyor to render the first conveyor active, and means automatically operative after a predetermined length of travel of the first conveyor to render said conveyor inactive.

Signed at Passaic, in the county of Passaic, and State of New Jersey, this thirty-first day of August, A. D. 1927.

HERBERT L. MERRICK.